United States Patent [19]
Eckert

[11] 3,826,506
[45] July 30, 1974

[54] TORIC SEAL, NONCIRCULAR SECTION
[75] Inventor: Edwin Joseph Eckert, Peoria, Ill.
[73] Assignee: Caterpillar Tractor Co., Peoria, Ill.
[22] Filed: Nov. 29, 1972
[21] Appl. No.: 310,245

[52] U.S. Cl. ............................................. 277/92
[51] Int. Cl. .......................................... F16j 15/34
[58] Field of Search ......................... 277/92, 237, 32

[56] References Cited
UNITED STATES PATENTS
| | | | |
|---|---|---|---|
| 3,315,972 | 4/1967 | Ahbeck | 277/237 |
| 3,528,669 | 9/1970 | Tondato | 277/237 |
| 3,623,737 | 11/1971 | Eckert | 277/237 |

Primary Examiner—Samuel B. Rothberg
Attorney, Agent, or Firm—Phillips, Moore, Weissenberger, Lempio & Strabala

[57] ABSTRACT

A retainer-torus-seal ring combination for a face-type seal has a toric member constructed with a noncircular cross section for producing (1) a rapid increase in face load with initial inward axial movement of the retainer with respect to the ring (during initial assembly) and (2) then a relatively constant face load during an extended amount of axially inward movement of the retainer with respect to the seal ring (as occurs during operation of a face seal).

4 Claims, 6 Drawing Figures

PATENTED JUL 30 1974 3,826,506
SHEET 1 OF 2
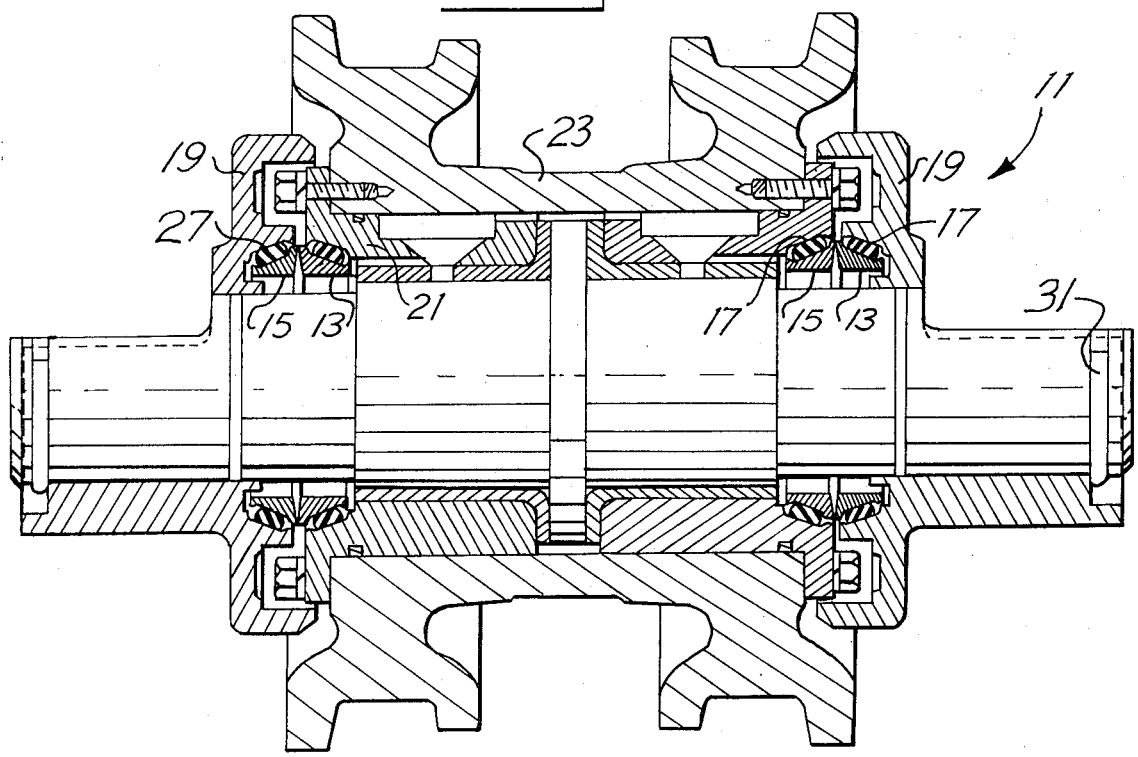
FIG. 1. PRIOR ART
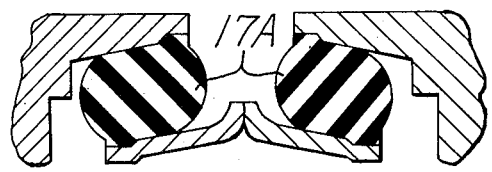
FIG. 2.
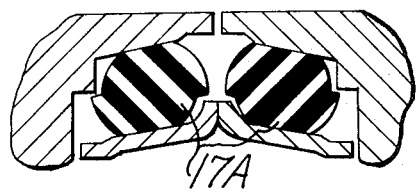
FIG. 3.
FIG. 4.

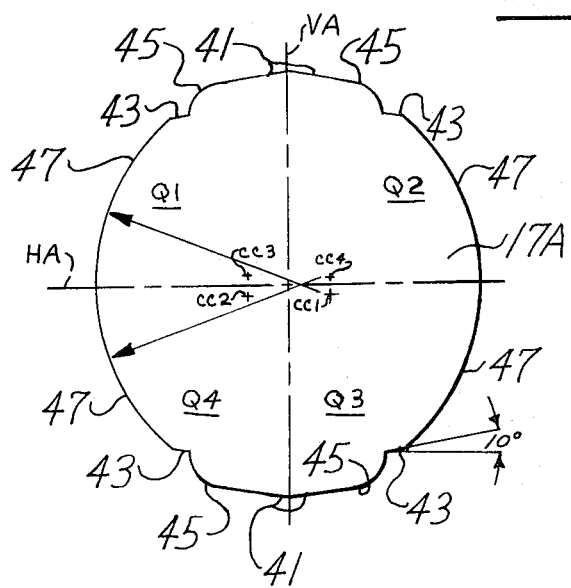
FIG-5-
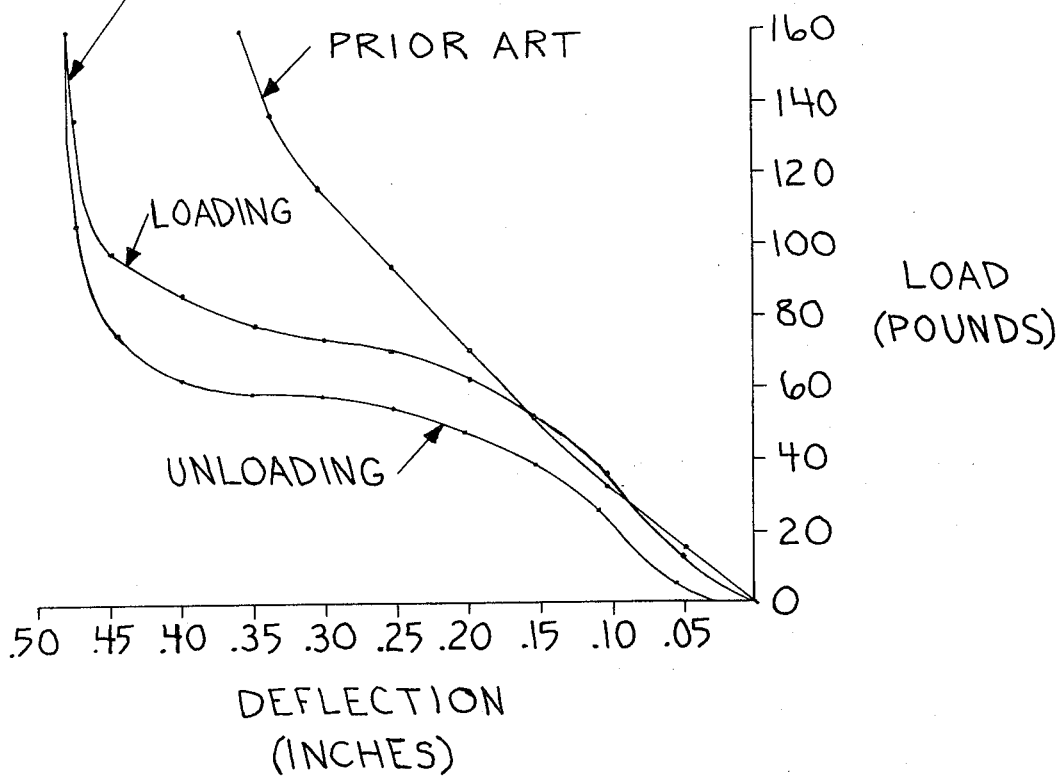
FIG-6-

3,826,506

TORIC SEAL, NONCIRCULAR SECTION

BACKGROUND OF THE INVENTION

This invention relates to a face-type seal for relatively rotating parts.

This invention relates particularly to a face-type seal having a metal seal ring, a retainer and a compressible toric member engaged between inclined ramps on the seal ring and the retainer both for suspending the seal ring and for producing the face load on the seal ring.

THE PRIOR ART

Resiliently suspended face seals have been in use for many years.

One of the first patents on such an arrangement is U.S. Pat. No. 1,862,887 to Durdin, Jr., issued on June 14, 1932.

The use of a compressible toric member between inclined ramps on a seal ring and a retainer member is also relatively old in the art.

U.S. Pat. No. 2,710,206 to Huber, issued June 7, 1955, is one of the first examples of this arrangement.

The load on the seal ring face is determined by the amount of compression of the resilient toric member. The seal is most effective if a relatively constant face load is maintained. This is particularly true in the case of relatively thin section metal seal rings which exhibit some degree of flexibility.

In the normal operating environment of such face seals, such as in a track roller installation, there is necessarily some movement of the retainer with respect to the seal ring. With a torus having a circular cross section (which is the torus most commonly used), this movement results in a variation of the compression of the torus as the torus is rolled to different positions along the ramp members. The variation in the compression of the torus produces variation in the face load of the seal.

SUMMARY OF THE INVENTION

It is a primary object of the present invention to construct an inclined ramp-compressed torus combination for a face seal which will produce substantially uniform loading over the range of axial movement of the retainer with respect to the seal incurred during normal operation.

It is a related object to accomplish the substantial uniform loading by a torus having a noncircular section.

In accordance with the present invention, a torus has a cross section which is symmetric about both a vertical axis and a horizontal axis of the toric cross section. Each quarter of the cross section of the torus has a curved outer surface, and the center of curvature of each curved surface is located in the diagonally opposite quarter of the cross section of the torus. The curvature of the curved surfaces is such as to provide a relatively constant diameter of the torus during axial movement of the retainer with respect to the ring during operation of the seal. The angles of inclination of the inclined ramps of the retainer and the seal ring are equal. The relatively constant diameter of the torus produces a relatively constant face load during all phases of operation of the face seal.

The torus also has flats formed for engaging corresponding flats on the retainer and on the seal ring during installation. The flats are offset from the ramps and, in combination with the curvature of the torus, provide for an immediate increase in face load as soon as the torus is rolled out of the flats during installation.

The flats on the retainer and on the seal ring are offset with respect to the inclined surfaces and the torus has radially projecting lips which act as retainers for holding the torus in position during initial assembly.

A retainer-torus-ring constructed to have the specific structural features noted above and effective to function in the ways described above constitutes a further, specific object of the present invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIG. 1 is an elevation view in cross section through a track roller assembly showing one installation in which the present invention may be embodied. FIG. 1 shows a prior art retainer-torus-ring combination;

FIGS. 2, 3, and 4 show in cross section a retainer-torus-ring combination constructed in accordance with one embodiment of the present invention. FIG. 2 shows the combination as it is positioned during initial installation. FIG. 3 shows the combination in the position assumed by the parts as the retainers are moved to an operative position. FIG. 4 shows the parts in the positions assumed when retainers are moved to an extreme axially inward position assumed during operation;

FIG. 5 is an enlarged view of the cross section of the torus shown in FIGS. 2-4;

FIG. 6 is a graph of the face load in pounds versus the deflection in inches of the retainer with respect to the seal ring.

TECHNICAL DISCLOSURE OF THE INVENTION

In FIG. 1 a track roller assembly is indicated generally by reference numeral 11.

The track roller assembly incorporates a retainer-torus-seal ring combination constructed in accordance with the prior art and presently employed in large volume commercial usage. The track roller assembly 11 is identical to that shown in U.S. Pat. No. 3,180,648 to Kupfert et al.

At each end of the track roller two seal rings 13 and 15 are engaged in sealing contact at the faces of the rings.

Toric members 17 are compressed between ramps on the seal rings and ramps on retainers 19 and 21.

The engaged seal rings 13 and 15 keep lubricant within the interior of track roller assembly 11 and keep foreign matter out of the interior.

The engaged seal rings 13 and 15 are subjected to relative rotation because the track roller 23 rolls on the track and rotates with respect to the shaft 25 fixed to the frame of the tractor.

The shaft 25 and associated retainer 19 undergo some axial shifting with respect to the track roller 23 and its associated retainers 21 during normal operation. This axial shifting causes the torus 17 to roll to different positions on the inclined ramps of the retainers and the seal rings, and this in turn varies the face load with which the seal rings 13 and 15 are engaged.

This axial movement must be accommodated, but the face load on the seal rings must be maintained within certain minimum and maximum values. Excessive face loads can cause fretting and galling of the rings. Too low a face load can permit foreign matter to enter between the seal rings.

The tori 17 of the prior art construction shown in FIG. 1 are circular in cross section, and the ramps of the retainers 19 and 21 are angled slightly with respect to the ramps of the rings 13 and 15 to provide some convergence. With a circular torus shown in FIG. 1 this convergence is necessary to develop the required minimum amount of face load as the retainers 19 are removed axially inwardly during initial assembly of the track roller assembly shown in FIG. 1. Since the ramps do converge and the torus has a circular cross section, the face load varies substantially linearly with axial movement of the shaft 25 (and its associated retainers) with respect to the track rollers 23 (and its associated retainers). This is illustrated in FIG. 6 by the curve entitled "Prior Art."

In accordance with the present invention a torus 17A is provided with an idealized outer circumference as best illustrated in FIG. 5 for developing a substantially uniform face load during axial movement of the retainer with respect to the seal ring.

The torus is associated with retainers 19A and 21A and seal rings 13A and 15A as illustrated in FIGS. 2–4.

The angle of inclination of the ramps 31 of the retainers is equal to the angles of inclination of ramps 33 of the seal ring. The inclination in each case is preferably about 10° from the horizontal.

Each retainer has a flat 35 which is offset from the ramp 31.

Each seal ring has a flat 37 which is offset from the ramp 33.

The torus 17A has flats 41 at the top and bottom of the cross section (as best illustrated in FIG. 5) which fit in the flats 35 and 37 during initial installation of the assembly.

The torus 17A also has flats 43 which are offset from the flats 41 and which are joined by a curved shoulder 45. The shoulders 45 engage corresponding concavely curved surfaces joining the flats 35 with the ramps 31 of the retainers and the flats 37 with the ramps 33 of the seal ring.

The construction of the torus 17A so far described serves as a retaining lip for holding the torus and seal rings in position during assembly, as illustrated in FIG. 2.

As illustrated in FIG. 5, the torus 17A is symmetric about a horizontal axis HA and a vertical axis VA. Each quarter of the cross section of the torus 17A is thus identical to each other quarter.

Each quarter section of the torus 17A has a curved outer surface 47, and the center of curvature is located in the diagonally opposite quarter section. The center of curvature is slightly off the horizontal axis and removed to a somewhat greater extent from the vertical axis.

Thus, numbering the quarters Q1 through Q4 starting with the upper lefthand quarter section and going clockwise, the curve 47 for the section Q1 has a center of curvature CC1 in section Q3, etc.

The mode of operation of the structure described above is set out in FIG. 6.

As illustrated in FIG. 6, the face load increases rapidly as the torus 17A is rolled out of the flat of the retainer and the seal ring during initial installation.

The face load then remains substantially constant for a relatively long period of travel (during a deflection of about 0.20 inches to 0.45 inches) as the retainer 19A is moved axially inwardly with respect to the associated seal ring 13A.

There is a hysteresis effect between loading movement and unloading movement, as also illustrated in FIG. 6, but the torus 17A of the present invention maintains a sufficiently high face load even during unloading movement to prevent separation of the seal rings and to prevent entry of foreign matter between the seal rings.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. An inclined ramp and compressed torus combination for suspending a face-type seal and for producing the face load on the seal and comprising: a seal ring having a radially projecting flange with a seal band on the forward, face side of the flange, said ring having an axially extending body and an inclined ramp on the outside of the axially extending body; a retainer having an inclined ramp facing the ring and of greater diameter than the ramp on the ring for compressing a torus between the ramps as the retainer is moved axially towards and over the ramp on the ring; and a resilient torus compressed between the two ramps; and wherein said torus is a solid member having a non-circular configuration in cross section which is related to the inclination of the ramp members to produce first a rapid increase in face loads with axial movement of the retainer towards the ring on assembly of the seal and then a substantially constant face load during a long extent of axial movement of the retainer towards the ring during operation of the ring, the cross section of the torus being symmetric about both a vertical axis and a horizontal axis of the toric cross section and each quarter of the cross section of the torus has a curved outer surface having a center of curvature located in the diagonally opposite quarter of the cross section of the torus.

2. An inclined ramp and compressed torus combination for suspending a face-type seal and for producing the face load on the seal and comprising: a seal ring having a radially projecting flange with a seal band on the forward, face side of the flange, said ring having an axially extending body and an inclined ramp on the outside of the axially extending body; a retainer having an inclined ramp facing the ring and of greater diameter than the ramp on the ring for compressing a torus between the ramps as the retainer is moved axially towards and over the ramp on the ring; and a resilient torus compressed between the two ramps; and wherein said torus is a solid member having a non-circular configuration in cross section which is related to the inclination of the ramp members to produce first a rapid increase in face loads with axial movement of the retainer towards the ring on assembly of the seal and then a substantially constant face load during a long extent of axial movement of the retainer towards the ring during operation of the ring, wherein each ramp has a substantially flat offset portion at the beginning of the ramp and the torus has substantially flat surfaces for engaging the flats on the ramp during initial assembly and wherein the torus has curved outer surfaces which join the flats to provide an immediate increase in cross sectional diameter as soon as the torus is rolled off the flats.

3. An inclined ramp and compressed torus combination for suspending a face-type seal and for producing the face load on the seal and comprising: a seal ring having a radially projecting flange with a seal band on the forward, face side of the flange, said ring having an axially extending body and an inclined ramp on the outside of the axially extending body; a retainer having an inclined ramp facing the ring and of greater diameter than the ramp on the ring for compressing a torus between the ramps as the retainer is moved axially towards and over the ramp on the ring; and a resilient torus compressed between the two ramps; and wherein said torus is a solid member having a non-circular configuration in cross section which is related to the inclination of the ramp members to produce first a rapid increase in face loads with axial movement of the retainer towards the ring on assembly of the seal and then a substantially constant face load during a long extent of axial movement of the retainer towards the ring during operation of the ring, wherein the retainer and the body of the ring have substantially flat portions which are offset with respect to the ramp and wherein the torus has exterior substantially flat surface portions which engage the offset portions on the retainer and the ring and wherein the torus also has radially projecting lips which act as retainers for holding the torus and ring in position during initial assembly of the retainer-torus-ring combination.

4. An inclined ramp and compressed torus combination for suspending a face-type seal and for producing the face load on the seal and comprising: a seal ring having a radially projecting flange with a seal band on the forward, face side of the flange, said ring having an axially extending body and an inclined ramp on the outside of the axially extending body; a retainer having an inclined ramp facing the ring and of greater diameter than the ramp on the ring for compressing a torus between the ramps as the retainer is moved axially towards and over the ramp on the ring; and a resilient torus compressed between the two ramps; and wherein said torus is a solid member having a non-circular configuration in cross section which is related to the inclination of the ramp members to produce first a rapid increase in face loads with axial movement of the retainer towards the ring on assembly of the seal and then a substantially constant face load during a long extent of axial movement of the retainer towards the ring during operation of the ring, wherein the angle of inclination of the ramp on the retainer is the same as the angle of inclination of the ramp on the ring so that there is no convergence between these ramps and wherein the retainer ramp has a flat, the ring has a flat and the torus has flats which fit in the flats on the retainer and the ring during initial assembly, and wherein the torus has curved outer surfaces which join the flats and provide an immediate increase in the cross sectional diameter of the torus for increasing the face load as soon as the retainer is moved axially towards the ring to roll the torus out of the flat and onto the ramp of the retainer and ring and wherein the curvatures of the said curved surfaces are such as to provide a relatively constant diameter of the torus during the continued axially inward movement of the retainer with respect to the ring as occurs during operation of the seal.

* * * * *